May 7, 1968     H. McBRYAR ETAL     3,382,105
ION-EXCHANGE MEMBRANE WITH PLATINUM ELECTRODE ASSEMBLY
Filed Dec. 29, 1964
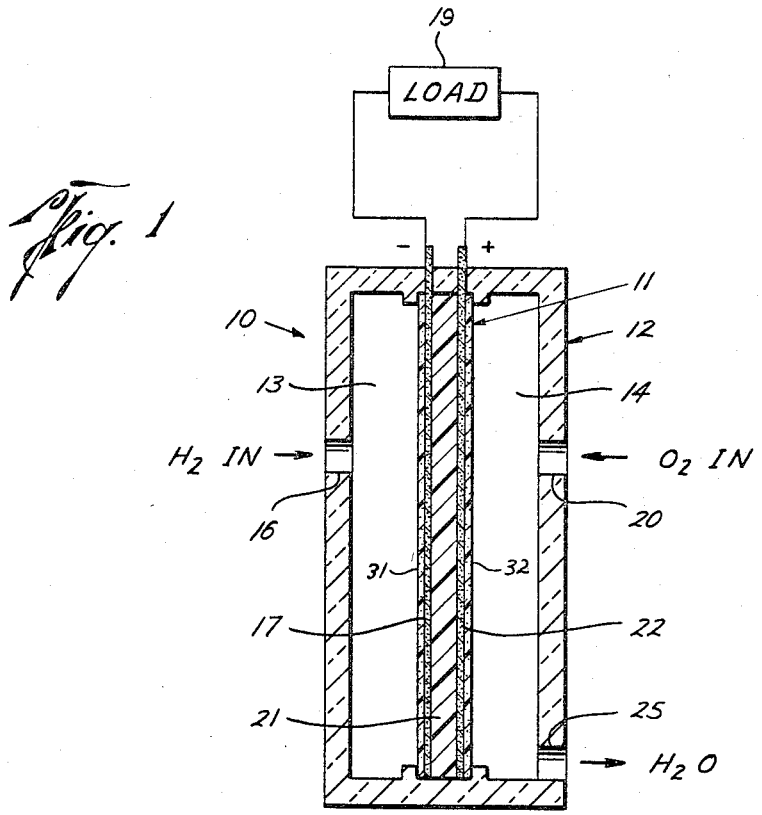
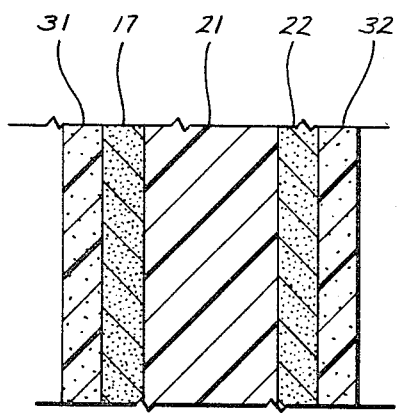
Hoyt Mc Bryar
Herschel H. Jamison
INVENTORS

United States Patent Office 3,382,105
Patented May 7, 1968

3,382,105
ION-EXCHANGE MEMBRANE WITH PLATINUM
ELECTRODE ASSEMBLY
Hoyt McBryar, Dickinson, and Herschel H. Jamison, Pasadena, Tex., assignors to the United States of America as represented by the Administrator of the National Aeronautics and Space Administration
Filed Dec. 29, 1964, Ser. No. 422,096
1 Claim. (Cl. 136—86)

ABSTRACT OF THE DISCLOSURE

An ion-exchange membrane and electrode assembly comprising an ion-exchange membrane between a pair of porous catalytic electrodes. A pair of thin plastic membranous sheets with finely divided platinum dispersed therein are superposed on to the catalytic electrodes. The thin plastic sheets are porous to hydrogen and oxygen, but are nonporous to complex ion-exchange groups of the ion-exchange membrane. The plastic sheets act as physical barriers to prevent escape of complex ion-exchange groups from the fuel cell and to prevent the flaking off of catalyst from the electrodes. The provision of platinum particles within the plastic sheets also increases the number of electrode reaction sites.

---

The invention described herein may be manufactured and used by or for the Government of the United States of America for governmental purposes without the payment of any royalty therein or therefor.

This invention relates to an ion-exchange membrane and electrode assembly and more particularly to an ion-exchange membrane and electrode assembly for fuel cells or electrolysis cells.

Fuel cells are well known electrochemical devices which convert the chemical energy of a fuel and oxidizer directly into electrical energy. Generally, the oxidant and fuel are in the form of reactant gases which are continually fed to the electrodes of the cell during current demand, the two electrodes being electrically connected through an external circuit. In a relatively recent type of fuel cell the electrolyte is in the form of an ion-exchange membrane which is generally a tough pliable sheet of plastic, usually an organic polymer with a molecular structure possessing the properties of an electrolyte. A typical membrane comprises a polystyrene sulfonic acid which provides ion-exchange groups for ion transport, and is intermixed with a fluorocarbon polymer to provide physical integrity. The membrane serves the dual role of reactant-gas partition and ion transport medium, and in the single-membrane type cell is sandwiched between two catalytic electrodes. A typical electrode is a bed of finely divided platinum which acts as an electrode and catalyst to the chemical reactions and is supported on a highly conductive metal screen such as titanium-palladium alloy.

In operation the reactant gases, usually hydrogen and oxygen, are admitted to their respective electrodes where their molecules are chemisorbed on the surfaces of the platinum particles. The hydrogen ion migrates through the acidic membrane and combines with the ionized oxygen and the electron from the hydrogen atom which traverses the external circuit to form water at the oxygen electrode.

One of the problems of ion-exchange membrane fuel cells is degradation of the membrane electrolyte with a consequent reduction in the lifetime of the cell. A principal cause of degradation of the membrane occurs from the rupture of the polymer chain and the escape of ion-exchange groups, such as the polystyrene sulfonic acid groups, through the platinum catalyst beds. At the oxygen electrode the ion-exchange groups are washed away with the product water which is formed at the oxygen electrode. Another problem which contributes to the electrochemical degradation of the cell results from the flaking of platinum catalyst particles due to vibrations and shocks to which the cell is subjected.

In this type of fuel cell the rate of electrical energy conversion is greatly dependent upon the number of reaction sites available to the reactant gases and the catalytic effect which the finely divided platinum contributes to the system. Both factors, however, are controlled and limited by the effective surface area of the platinum catalyst which is exposed to the reactant gases as determined by the average particle size of the platinum and the extent to which the particles have been separated from agglomerates which contain numerous particles.

The ion-exchange membrane and electrode assembly of this invention which has been devised to overcome the attendant disadvantages in the prior art, utilizes a pair of thin plastic membranous sheets superposed onto the platinum catalytic electrodes between which the sulfonated ion-exchange membrane is located. The thin plastic sheets, although porous to hydrogen and oxygen, are nonporous to the complex ion-exchange groups of the ion-exchange membrane, and are also provided with finely divided platinum which is highly dispersed therein. The ion-exchange membrane with attached platinum electrodes and the two plastic sheets are pressed together under temperature and pressure to produce a laminated structure in which the thin plastic sheets act as physical barriers to prevent the escape of the polystyrene sulfonic acid groups from the fuel cell. The thin sheets also prevent the platinum catalyst from flaking off from the ion-exchange membrane. By thus preventing the loss of platinum catalyst and the loss of ion exchange groups from the membrane electrolyte, a substantial improvement is obtainable in the lifetime of the cell by several orders of magnitude over conventional cells. Also, by provision of the highly dispersed platinum in the exterior membranes, the chances for the molecules of reactant gases to contact a reaction site are greatly enhanced, thereby improving the performance of the cell.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a schematic view of a single-membrane, ion-exchange fuel cell which incorporates the novel ion-exchange membrane and electrode assembly of this invention; and FIG. 2 is an enlarged fragmentary cross-sectional view of the ion-exchange membrane and electrode assembly of this invention.

Referring more particularly to the drawings, there is shown in FIG. 1 a fuel cell 10 which incorporates the novel ion-exchange membrane and electrode assembly 11 of this invention. The fuel cell comprises a housing 12 which is divided into compartments 13 and 14 by the membrane and electrode assembly. For a laboratory cell, the housing is usually fabricated of a dielectric material such as glass, or the like. The fuel, which may be hydrogen gas or a hydrogen containing gas, is continuously supplied to the compartment 13 through the inlet 16 where it is ionized at the catalytic electrode and supplies electrons to provide useful electricity for the external circuit which includes the load 19. In like manner the oxidizer, which may be air or pure oxygen, is supplied to the compartment 14 through the housing inlet 20. The hydrogen ion migrates through the acidic ion-exchange membrane 21 and combines with ionized oxygen at the catalytic electrode 22 and electrons to produce water which may be drained away through the drain outlet 25 by any suitable means (not shown). The ion-exchange membrane 21 is a commercially available type comprising a polystyrene sulfonic acid which provides negative ion-exchange groups for ion transport and a fluorocarbon polymer intermixed therewith which lends physical integrity to the membrane. The membrane is substantially non-porous to either of the reactant gases and is typically in the order of .01 inch thick.

The electrodes 17 and 22 are each in the form of a bed of finely divided platinum which acts as a catalyst to the chemical reactions and is supported on a highly conductive metal screen such as titanium-palladium alloy, or a noble metal. The electrodes are approximately .003 inch thick and are of a sufficiently large surface area to completely cover the faces of each side of the ion-exchange membrane 21.

Superposed on the catalytic electrodes are thin plastic membranous sheets 31 and 32, respectively, of polyethylene, Teflon, or the like. These sheets are each porous to the reactant gases, but are nonporous to the reactive groups of the ion-exchange membrane. Each of the thin plastic sheets 31 and 32 is also provided with highly dispersed particles of platinum catalyst and is characterized by a homogenous porosity as may be achieved by a conventional leaching process. The areal dimensions of the sheets 31 and 32 are sufficient to completely cover the catalyst beds and are laminated thereto under temperature and pressure.

Normally, the ion-exchange groups such as the polystyrene sulfonic acid groups are held immobile in long polymer chains. A rupture of the polymer chain, due to extreme temperatures for example, reduces the size of the groups whereby they achieve mobility. Plastic sheets 31 and 32, however, act as physical barriers to prevent the escape of the ion-exchange groups and retain them to perform their function of ion transport. The plastic sheets also serve to entrap and support the platinum catalyst beds and thereby prevent platinum from flaking off the electrodes as frequently occurs when the cell is subjected to vibrations or sudden jarring. Consequently, by preventing the loss of catalyst and the loss of ion-exchange groups from the membrane electrolyte, a substantial improvement is obtainable in the effective lifetime of the fuel cell. Furthermore, since the plastic sheets are also porous to the reactant gases and contain dispersed platinum particles, the reactant gas supplied at each electrode has, therefore, a greater number of platinum particles with which to contact than if the laminar sheets 31 and 32 were not present. The number of reactions sites available to support the chemical reactions is therefore increased substantially by the surface areas of the dispersed particles in the plastic sheets and a more efficient cell is thereby produced.

It is to be understood, of course, that while this invention has been described with respect to a cell which utilizes an acidic ion-exchange membrane, it is also applicable to a cell which incorporates a basic type membrane with positively charged ion-exchange groups for transporting hydroxyl ions from the cathode to the anode.

Furthermore, while the oxidant and fuel have been described as reactant gases, the invention is also applicable to cells in which the oxidant and fuel are of liquid form, such as, for instance, nitrogen tetroxide and hydrazine. For such applications the laminar plastic sheets 31 and 32 are made impermeable to the particular ion-exchange groups of the membrane electrolyte, while being permeable to the oxidant and fuel, whether liquids or gases. The porous catalytic electrodes could also be fabricated of materials other than finely divided platinum, such as, for example, other noble metals or a porous carbon containing a noble metal catalyst.

It should therefore be understood that the foregoing disclosure relates only to preferred embodiments of the invention and that it is intended to cover all changes and modifications of the examples in the invention herein chosen for the purposes of the disclosure and which do not constitute departure from the spirit and scope of the invention.

What is claimed and desired to be secured by Letters Patent is:

1. An ion-exchange membrane and electrode assembly for a gaseous fuel cell in which said membrane is disposed in a container and acts as a partition between the reactant gases which are supplied to the cell, said assembly comprising:

an electrolytically conductive ion-exchange membrane comprising ion-exchange groups;

a first gas permeable electrode in the form of a sheet consisting essentially of finely divided platinum;

a second gas permeable electrode in the form of a sheet consisting essentially of finely divided platinum, said membrane being positioned between said electrodes and secured in face-to-face physical contact therewith whereby said electrodes completely cover the opposite faces of said membrane and form a laminar structure therewith; and barrier means permeable to gases but impermeable to the ion-exchange groups of said membrane, said latter means comprising a pair of thin membranous plastic sheets each covering a different one of said electrodes and serving as a barrier to prevent the escape of ion-exchange groups from the ion-exchange membrane and electrode assembly, said membranous sheets being provided with particles of platinum which are dispersed throughout said sheets to thereby substantially increase the number of reaction sites available to support the electromechanical reactions occurring at said electrodes.

References Cited
UNITED STATES PATENTS

| | | | |
|---|---|---|---|
| 2,913,511 | 11/1959 | Grubb | 136—86 |
| 3,134,697 | 5/1964 | Niedrach | 136—86 |
| 3,143,440 | 8/1964 | Hunger et al. | 136—86 |
| 3,276,909 | 10/1966 | Moos | 136—86 |
| 3,284,240 | 11/1966 | Kring | 136—86 |
| 3,297,482 | 1/1967 | Zimmer | 136—86 |
| 3,297,484 | 1/1967 | Niedrach | 136—86 |

ALLEN B. CURTIS, *Primary Examiner.*